United States Patent [19]
Enright

[11] Patent Number: 6,149,442
[45] Date of Patent: *Nov. 21, 2000

[54] HINGE ASSEMBLIES FOR ELECTRONIC DEVICES

[75] Inventor: Roger Charles James Enright, Chandlers Ford, United Kingdom

[73] Assignee: Telefonaktiebolaget LM Ericsson, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 09/249,799

[22] Filed: Feb. 16, 1999

[30] Foreign Application Priority Data

Feb. 17, 1998 [GB] United Kingdom .................. 9803341

[51] Int. Cl.[7] .................................................. H01R 39/00
[52] U.S. Cl. ............................................ 439/31; 439/10
[58] Field of Search ............................... 439/10, 31, 165; 379/447; 361/814

[56] References Cited

U.S. PATENT DOCUMENTS

| | | | |
|---|---|---|---|
| 5,237,488 | 8/1993 | Moser et al. | 361/729 |
| 5,661,641 | 8/1997 | Shindo | 361/814 |
| 5,719,936 | 2/1998 | Hillenmayer | 379/447 |

FOREIGN PATENT DOCUMENTS

| | | |
|---|---|---|
| 0 472 361 | 2/1992 | European Pat. Off. . |
| 0 731 589 | 9/1996 | European Pat. Off. . |
| 0 776 140 | 5/1997 | European Pat. Off. . |
| 2 179 500 | 3/1987 | United Kingdom . |
| 2 289 555 | 11/1995 | United Kingdom . |
| 2 289 595 | 11/1995 | United Kingdom . |
| 2 294 844 | 5/1996 | United Kingdom . |
| WO92/09178 | 5/1992 | WIPO . |

*Primary Examiner*—Brian Sircus
*Assistant Examiner*—Chandrika Prasad
*Attorney, Agent, or Firm*—Burns, Doane, Swecker & Mathis, L.L.P.

[57] ABSTRACT

An electronic device comprises a first housing (2) and a second housing (4) which is mounted on the first housing (2) by way of a hinge assembly (12). The hinge assembly comprises first and second cooperating parts (121, 122) attached to the first and second housings respectively. The second part (122) is rotatably and slidably engaged with the first part (121), such that the second housing (4) is rotatable with respect to the first part (2), about an axis from the closed position to a first open position of the device, and such that the second housing is linearly movable, with respect to the first housing, in a direction parallel to the axis, with respect to the first housing, from a closed position of the device to a second open position of the device.

6 Claims, 4 Drawing Sheets

6,149,442

HINGE ASSEMBLIES FOR ELECTRONIC DEVICES

This application claims priority under 35 U.S.C. §§119 and/or 365 to 9803341.8 filed in United Kingdom on Feb. 17, 1998; the entire content of which is hereby incorporated by reference.

The present invention relates to hinge assemblies for use with electronic devices. For example, but not exclusively, the present invention relates to hinge assemblies for mobile telephones and portable computers.

DESCRIPTION OF THE RELATED ART

Many current mobile telephones make use of a hinged cover, or "flip", to enable the size of the telephone to be kept desirably small and to protect the display and keypad of the telephone when not in use. Similarly, portable computers/electronic organisers make use of hinged cases to enable a small size of device to be produced, as well as to provide protection for display and keypad components.

However, previously considered hinge assembly designs do not readily allow a mobile telephone to include portable computer/electronic organiser functions, whilst retaining the small size and ability to protect components of current separate mobile telephones and organisers.

SUMMARY OF THE PRESENT INVENTION

According to a first aspect of the present invention, there is provided an electronic device comprising a first housing and a second housing which is mounted on the first housing by way of a hinge assembly, wherein the hinge assembly comprises:

first and second cooperating parts attached to the first and second housings respectively, the second part being rotatably and slidably engaged with the first part, such that the second housing is rotatable with respect to the first part, about an axis from the closed position to a first open position of the device, and such that the second housing is linearly movable, with respect to the first housing, in a direction parallel to the axis, with respect to the first housing, from a closed position of the device to a second open position of the device.

DETAILS OF THE DESCRIPTION OF THE PREFERRED EMBODIMENT

Figure 1:
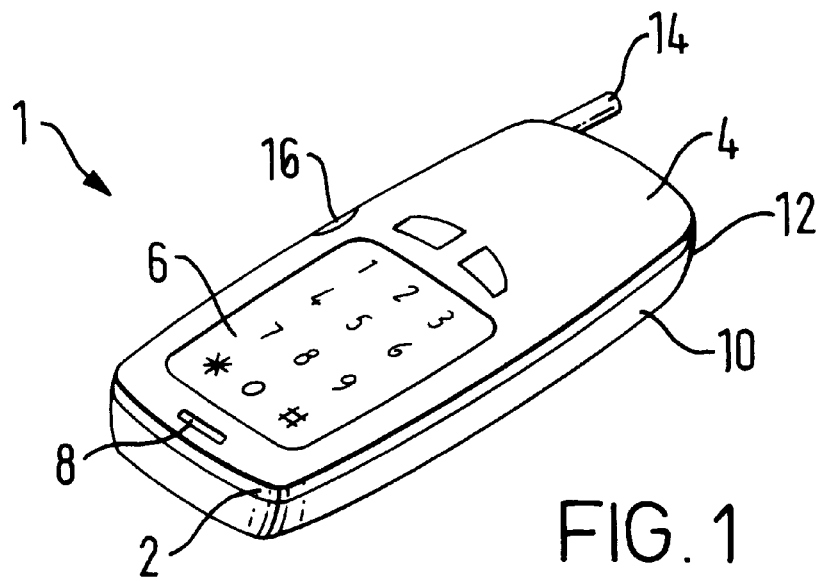
FIG. 1 shows a mobile telephone including a hinge assembly embodying one aspect of the present invention, in a closed position.

A mobile telephone 1 is shown in FIG. 1 in a closed position, and comprises first and second housings 2 and 4 which are movably attached to one another by way of a hinge assembly 12.

In this example, the first housing 2 carries a battery 10 and an antenna 14. The second housing member carries a keypad 6 for user input, and a microphone 8.

In the closed position shown in FIG. 1, the second housing 4 covers the whole of an upper face of the first housing 2, and is held in place by way of a clip 16. In this condition, the telephone is sealed, and the internal components of the telephone are protected from damage.

Figure 2:
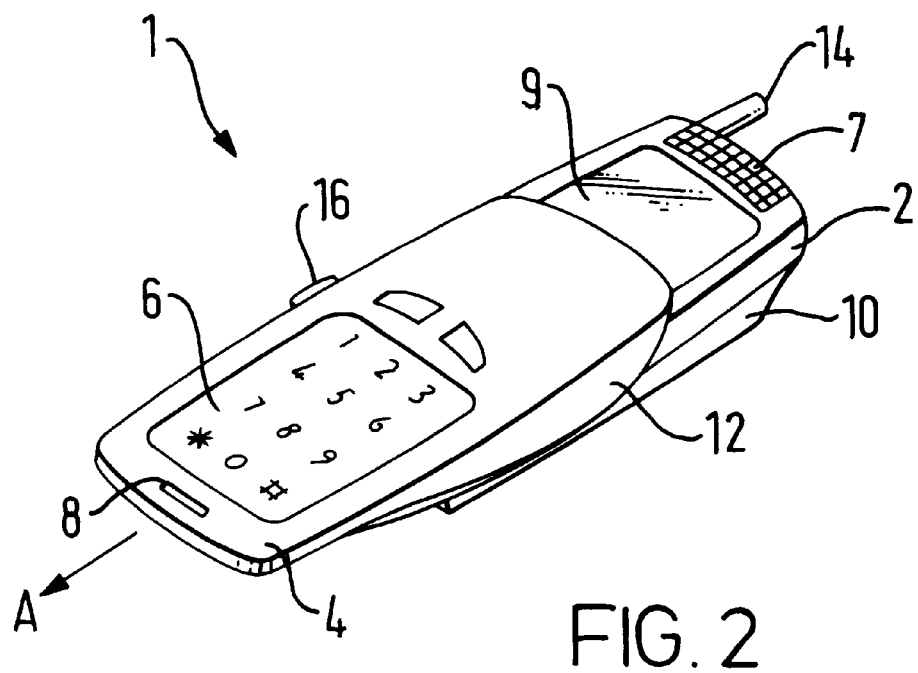
FIG. 2 shows the mobile telephone of FIG. 1 in a first open position.

A first open position of the telephone is shown in FIG. 2, in which the telephone has the usual functions of a mobile telephone, ie. sending and receiving telephone calls. To enable such use, the second housing, or cover, 4 is moved along the housing 2, so that a telephone display 9, and a loudspeaker 7 are revealed for use in conventional manner by the user of the telephone. In one embodiment of the invention, the movement of the cover 4 can automatically cause the telephone to answer an incoming call, or to be put into a dialling mode (ie. an "off-hook" condition).

Figure 3:
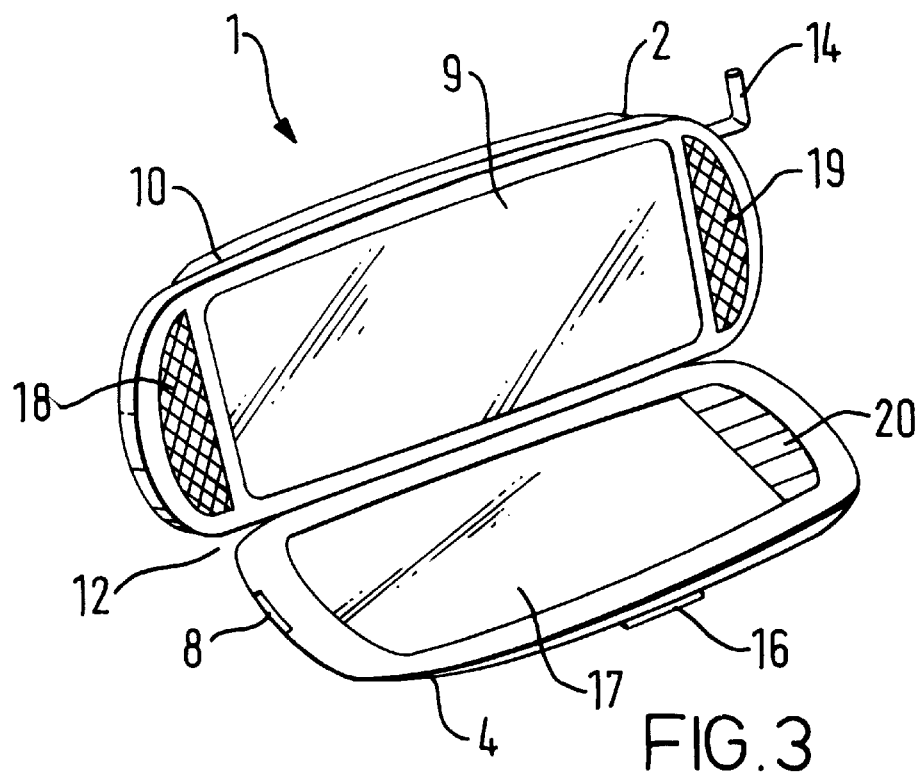
FIG. 3 shows the mobile telephone of FIG. 1 in a second open position.

FIG. 3 shows a second open position of the telephone, in which the cover 4 has been opened, from the closed position of FIG. 1, about the hinge assembly 12, to reveal fully the display 9 carried by the main housing 2. The cover 4 can carry on its inner surface an input device, for example a touch sensitive scribble pad, to enable a user of the device to input data. In the example shown, speakers 18 and 19 are provided in the main housing 1 for relaying audio information to the user. In this second open position, the mobile telephone can be used as a portable computer/electronic organiser. For example, the input device can be used to input text for downloading to an office computer, or the device could be used to send facsimile message by making use of the mobile telephone functions.

The hinge assembly 12 is shown in greater detail in FIGS. 4 to 9.

Figure 4:
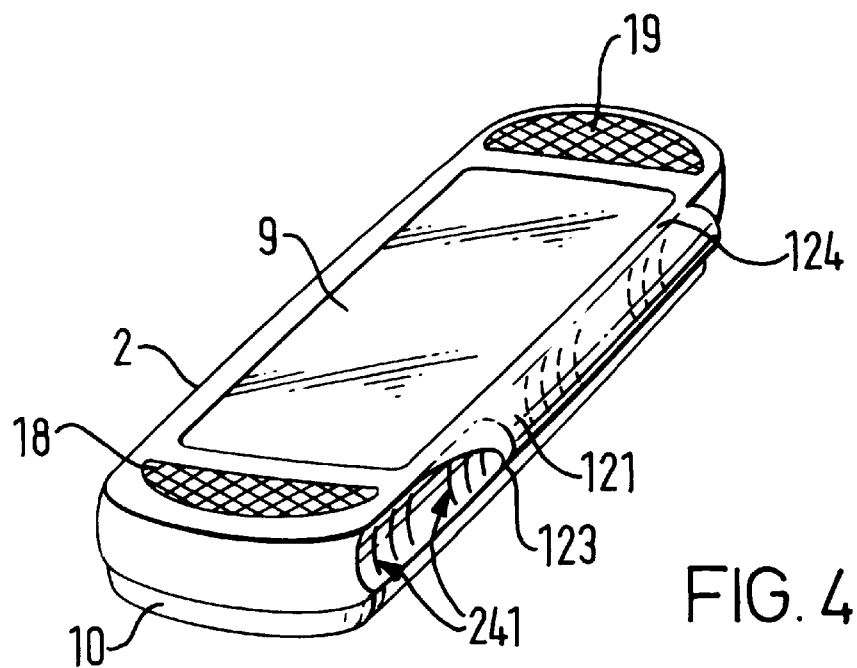
FIGS. 4 and 5 show perspective and end views respectively of a first housing of the telephone of FIG. 1.
Figure 5:
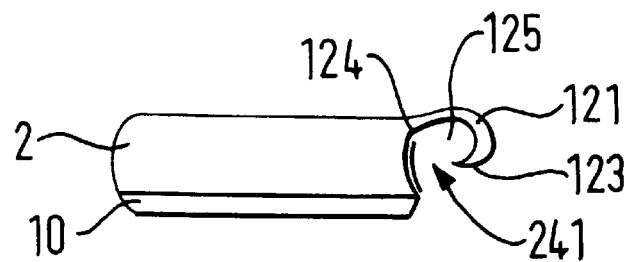

Referring to FIG. 4 and 5, the first housing 2 of the telephone carries a first part 121 of the hinge assembly 12. This first part 121 extends along at least part of one side edge region of the housing 2 by way of a connecting portion 124. The first part 121 curves from the front edge region towards the rear edge region of one side of the telephone, thereby defining a curved internal surface 125. The curved surface 125 is for engagement with a second part of the hinge as will be described below.

The curved surface 125 carries a number of contacts 241 for providing power and function control for the telephone. The contacts are intended to connect with corresponding contacts on the second part of the hinge assembly 12.

Figure 6:
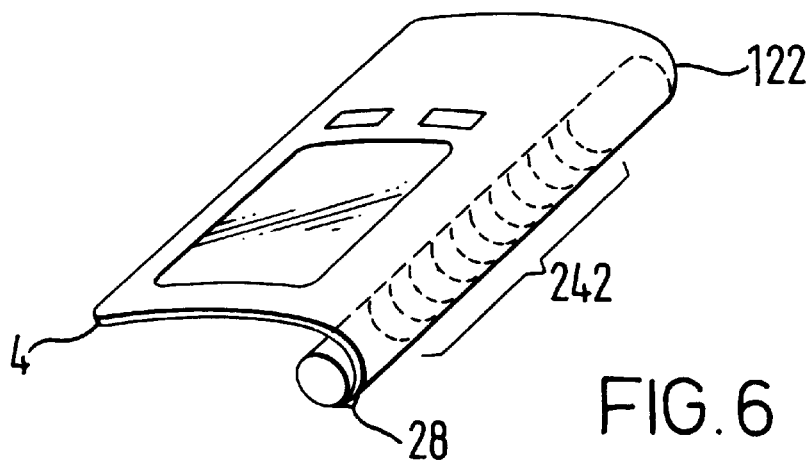
FIGS. 6 and 7 show perspective and end views respectively of a second housing of the telephone of FIG. 1.
Figure 7:
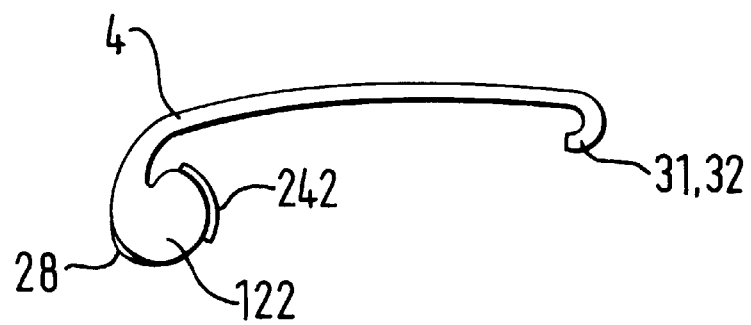

FIG. 6 shows a perspective view of the second housing 4, and FIG. 7 shows an end view thereof. The second housing 4 carries a substantially cylindrical elongate second part 122 which forms the hinge pin of the hinge assembly 12. The second part 122 extends along on edge region of the second housing 4, and defines a curved external surface for engagement with the curved internal surface of the first part 121. The second part 122 carries, on the outer surface thereof, contacts 242 which are for connecting with the contacts 241 carried by the first part 121. The second part is also provided with a stop 28 for preventing excessive rotation between the two housings, The electrical connections made by the contacts 241 and 242 are dependent upon the relative positions of the first and second housings 2 and 4, and are preferably used to determine the function of the device (ie. a mobile telephone, or portable computer). The contacts 241 and 242 can also be used for power transfer between the two housings 2 and 4 in the two open positions. In addition, a contact can be specifically provided to initiate changes in function of the telephone when the housings 2 and 4 are moved between the two open positions. The contacts can also be used for the transfer of data between components in the two housings 2 and 4.

Figure 8:
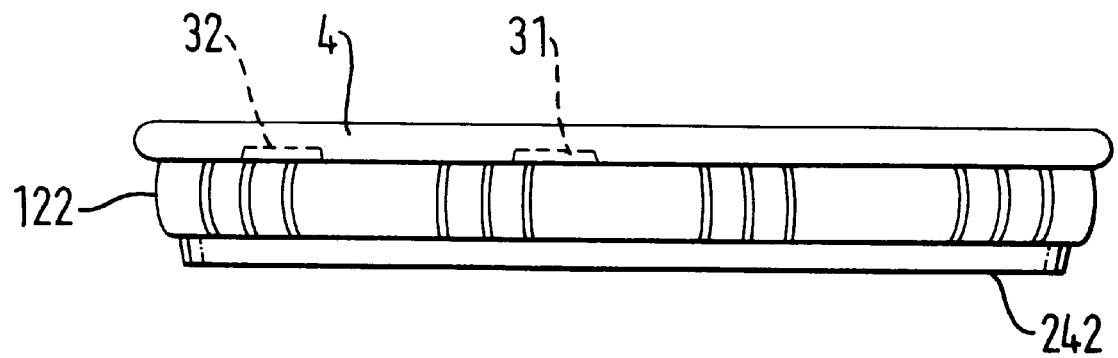
FIG. 8 shows a side elevation of the housing of FIGS. 6 and 7.

In order to hold the two housings 2 and 4 in place in the various positions, the first housing 2 is provided with a clip arrangement 16, and the second housing 4 is provided with two stop members 31 and 32. These stop members are shown in FIGS. 8 and 9.

Figure 9:
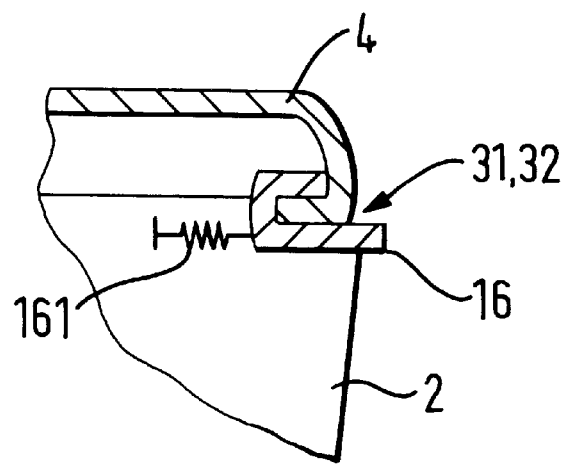
FIG. 9 shows a partial end cross-sectional view of the housings of the telephone of FIG. 1.

As shown in FIG. 9, a first stop member 31 is engaged with the clip 16. The clip 16 is biased to engage with the stop member concerned by way of a spring device 161. In order to release the second housing 4 from the closed position of the device, the clip 16 is pressed into the first housing 2, thereby releasing the stop member 31. The second housing 4 can then be moved along the first housing 2 until the second stop member 32 engages with the clip 16. The device is then held in the first open position.

Similarly, the clip 16 must be depressed so that the second housing 4 can be rotated about the hinge 12 in order to provide the second open position of the device.

What is claimed is:

1. An electronic device comprising a first housing and a second housing which is mounted on the first housing by way of a hinge assembly, wherein the hinge assembly comprises:

first and second cooperating parts attached to the first and second housings respectively, the second part being rotatably and slidably engaged with the first part such that the second housing is rotatable with respect to the first part about an axis from a fully closed position to a first open position of the device without first linearly moving the first and second housings relative to each other from the closed position, and such that the second housing is linearly movable, with respect to the first housing, in a direction parallel to the axis, with respect to the first housing, from the closed position of the device to a second open position of the device.

2. An electronic device as claimed in claim 1, wherein the first part of the hinge assembly is provided by a first elongate member which extends along an edge region of the first housing of the device, and which defines a first surface extending along the first part, and wherein the second part of the hinge assembly is provided by a second elongate member which extends along an edge region of the second housing, and which defines a second surface, the second elongate member being engaged with the first elongate member such that at least part of the first surface is in contact with the second surface.

3. An electronic device as claimed in claim 1, wherein the first part of the hinge assembly is provided by a first elongate member which extends along an edge region of the first housing of the device, and which defines a first surface extending along the first part, and wherein the second part of the hinge assembly is provided by a second elongate member which extends along an edge region of the second housing, and which defines a second surface, the second elongate member being engaged with the first elongate member such that at least part of the first surface is in contact with the second surface, and wherein the first and second surfaces carry electrical contacts for establishing electrical connections between the first and second housings in dependence upon the relative position of the first housing with respect to the first housing.

4. An electronic device as claimed in claim 1, wherein the first part of the hinge assembly is provided by a first elongate member which extends along an edge region of the first housing of the device, and which defines a first surface extending along the first part, and wherein the second part of the hinge assembly is provided by a second elongate member which extends along an edge region of the second housing, and which defines a second surface, the second elongate member being engaged with the first elongate member such that at least part of the first surface is in contact with the second surface, and wherein the first surface is an internal concave curved surface, and the second surface is a corresponding external convex curved surface, the second part of the hinge assembly being at least partially held within the first part.

5. An electronic device as claimed in claim 1, wherein the first part of the hinge assembly is provided by a first elongate member which extends along an edge region of the first housing of the device, and which defines a first surface extending along the first part, and wherein the second part of the hinge assembly is provided by a second elongate member which extends along an edge region of the second housing, and which defines a second surface, the second elongate member being engaged with the first elongate member such that at least part of the first surface is in contact with the second surface, and wherein the first and second surfaces carry electrical contacts for establishing electrical connections between the first and second housings in dependence upon the relative position of the first housing with respect to the first housing, and wherein the first surface is an internal concave curved surface, and the second surface is a corresponding external convex curved surface, the second part of the hinge assembly being at least partially held within the first part.

6. An electronic device as claimed in claim 1, wherein the first and second housings carry respective cooperating parts of a clip mechanism for holding the housings in a desired one of the closed, first and second open positions.

* * * * *